Aug. 12, 1958 C. Z. ALEXANDER 2,847,545
PORTABLE ELECTRICAL HEATING DEVICE
Filed Jan. 23, 1957
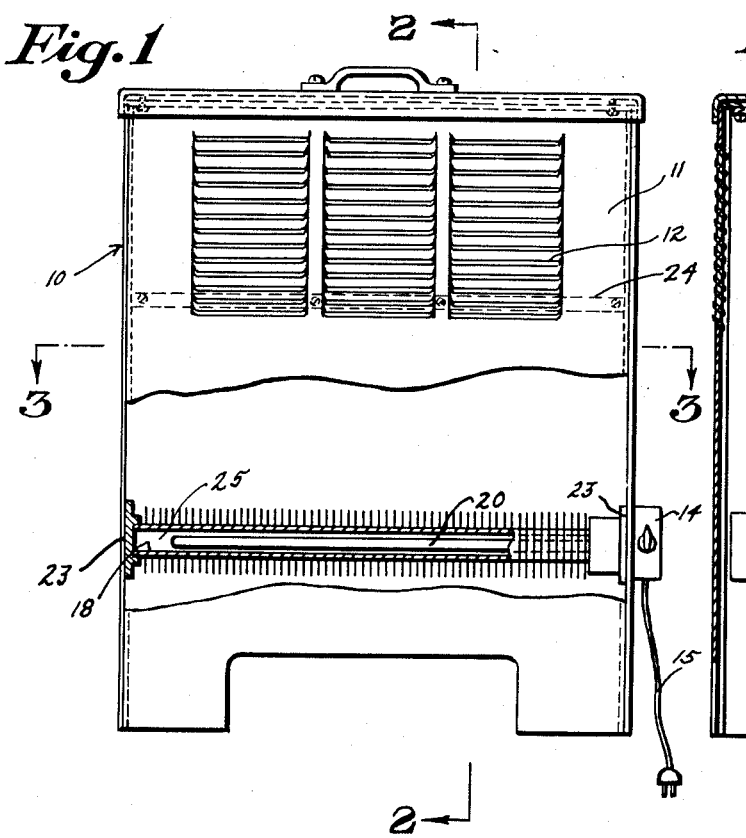
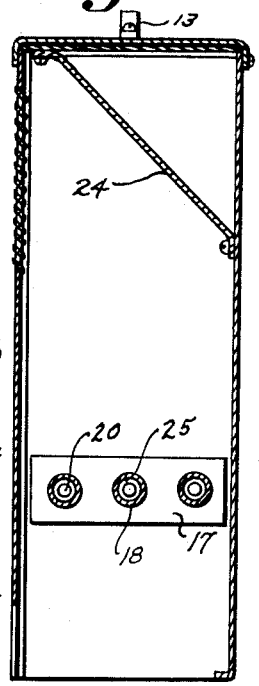
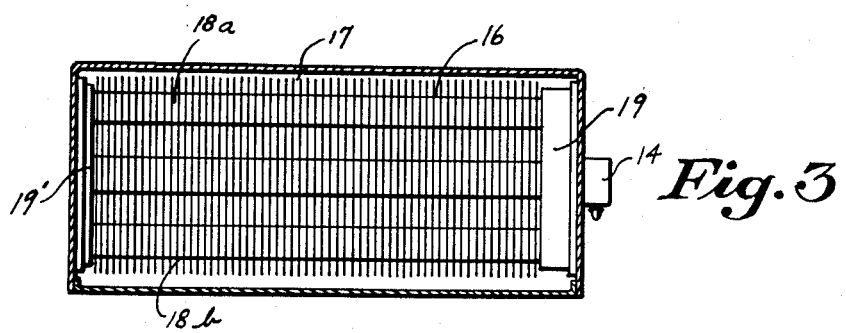
INVENTOR.
CARL Z. ALEXANDER
BY
Richards & Geier
ATTORNEYS

2,847,545

PORTABLE ELECTRICAL HEATING DEVICE

Carl Z. Alexander, Chatham, N. J.

Application January 23, 1957, Serial No. 635,774

1 Claim. (Cl. 219—38)

This invention relates to a heating device, and more particularly refers to a portable domestic heating unit adapted with an electrical heating rod and thermostat.

One of the main advantages offered by the heating device of the present invention is that the unit eliminates problems of furniture placement and room decoration are minimized. Furthermore, its design purports a fully compact unit which harmonizes with other household furnishings. Its balanced heat distribution permits perfect temperature balance effected through its structural features. Numerous attempts have been made to devise a highly efficient and an immediate responsive heating unit. However, the heating device of the present invention has yielded a thoroughly satisfactory and practical solution to this problem.

It is an object of the present invention to provide a greater degree of maneuverability and operating efficiency in an electrical heating device.

Another object of the present invention is to provide greater economy in the utilization of electrical energy for heat responsive elements.

Another object of the present invention is to provide a greater degree of utility and adaptability in electrical heating devices.

Other objects will become apparent during the course of the following specification.

In the attainment of the aforesaid objectives, the preferred embodiment of the present invention may be realized through the provision of a unit which may be constituted of three parallel heating pipes connected at each end to a common manifold. Within each heating pipe an electrical heating rod may be disposed within the respective passages. The number of heating rods in a heating unit may vary depending upon individual circumstances. A switch or a thermostat may be operatively connected to one end of the electrical heating rod and may be disposed along one side of the hood of the heating unit.

The three parallel pipes may be equidistantly spaced from each other on a horizontal plane with respect to the horizontal plane of the unit supporting surface. Each of the heating pipes may be constituted further of a plurality of equidistantly disposed transverse fins.

In a preferred embodiment the heating unit may contain, as herein-described, an arbitrary number of parallel heating pipes. However, for purposes of illustration, the heating unit shown in the drawing is constituted of three parallel heating pipes which hereinafter will be described as the convector element.

To attain the greatest efficiency of the heating unit the convector element is disposed on a plane approximately one-fourth the entire height of the unit from the bottom surfaces of the unit. The convector element is securely fastened at both its ends to a suitable support structure in a common manner.

The hood may be of rectangular shape and made of a suitable rigid material, preferably a metal alloy conducive to decorative qualities. The upper side surfaces of the hood may have machined therein a plurality of louvres.

A fuller understanding of the present invention may be had by referring to the following description taken in conjunction with the accompanying drawings showing, by way of example, a preferred embodiment of the inventive idea.

In the drawing:

Figure 1 is a front elevational view, partly in section, showing the novel structural features of the present invention.

Figure 2 is a sectional view taken along the lines 2—2 of Figure 1, showing the heating pipes and rod of the convector element.

Figure 3 is a top view of the convector element.

Referring now in greater detail to the drawings reference numeral 10 indicates a portable electrical heating device and like reference numerals indicate like parts.

The heating unit 10 is constituted of an outer enclosure or hood 11, which is rectangularly shaped, and which has machined along the sides of its upper surfaces a plurality of equidistantly disposed louvres 12.

The uppermost or top surface of the hood 11 is provided with a handle 13. Along one side surface of the hood 11 is disposed a thermostat 14, as shown in Figure 1. The thermostat 14 is provided with an electrical lead 15 at one end thereof.

A convector element 16 is securely fastened at both its ends to a support member 23. In the preferred construction of the present invention the convector element 16 is comprised of three parallel equidistantly disposed heating pipes 18. Each of the heating pipes 18 are circumjacently provided with a plurality of equidistantly disposed rectangularly formed transverse fins 17. The ends of the heating pipes 18 are joined to a common manifold 19 and 19' at both ends of the convector element 16, respectively. Within the central passage 25 of the heating pipe 18 is disposed a heating rod 20 which is operatively connected at one end thereof to the electrical source 15 and thermostat 14.

It will become apparent from this construction that the passages of the end heating pipes 18a and 18b may also contain a heating rod and may be constructed with a variable number of heating pipes depending upon the size of the unit desired and individual circumstances.

In the preferred construction of the present invention the heating rod 20 radiates heat in the passages between the heating pipe and heating element. Heat transfer and radiation may also occur through direct contact with the heating pipes and heating element. The heating pipe 18 subsequently transfers the heat to the transverse fins 17. As the heat rises it is deflected by a deflector 24 and escapes through the louvres 12 into the atmosphere.

One of the most salient features of the present invention is that the novel heating unit requires a minimum of electrical energy to obtain an instant balanced distribution of radiant heat. The unit is furthermore fully compact and occupies a minimum amount of floor space, thereby minimizes problems of room decoration and furniture placement. Its instantaneous response is a highly desirable feature which typifies its efficiency. The unit is designed to insure exact heat balance with structure loss at designated temperatures and to keep operating costs to a minimum.

Another advantage of the present invention is that the improved heating device will have longer life with resulting economy of replacement and maintenance and with a completely negligible increase in manufacturing costs.

Thus it will be understood that certain features and sub-combinations are of utility and may be employed without reference to other features and sub-combinations.

This is contemplated by and is within the scope of the appended claim. It is further obvious that various changes may be made in details within the scope of the claim without departing from the spirit of the invention. Hence it is to be understood that the subject invention is not to be limited to the specific details shown and described herein.

What is claimed is:

A portable electrical heating device, comprising a hood having an upper portion and a lower portion, a convector element having a plurality of parallel heating pipes, fins carried by said pipes, heating rods within said pipes, and separate manifolds connected with opposite ends of said pipes; means connected with said manifolds and supporting said convector element in the lower portion of said hood, a thermostat carried upon an outer surface of the hood on the level of said convector element and firmly connected with said convector element, louvres upon one surface of the upper portion of said hood, and a deflector located within said upper hood portion in front of said louvres and between two inner surfaces of said upper hood portion.

References Cited in the file of this patent

UNITED STATES PATENTS

| | | |
|---|---|---|
| 2,606,993 | Geoffrion | Aug. 12, 1952 |
| 2,662,963 | Wessel | Dec. 15, 1953 |
| 2,683,209 | Beckjord | July 6, 1954 |